United States Patent [19]

Moery et al.

[11] 3,934,392

[45] Jan. 27, 1976

[54] DEBRIS COLLECTOR FOR LAWN AND GARDEN MACHINES

[75] Inventors: John A. Moery, Willow Springs; Harlin J. Trefz, Clarendon Hills, both of Ill.

[73] Assignee: International Harvester Company, Chicago, Ill.

[22] Filed: Nov. 4, 1974

[21] Appl. No.: 520,753

[52] U.S. Cl. .............................................. 56/202
[51] Int. Cl.² ......................................... A01D 35/26
[58] Field of Search ........ 56/202, 13.4, 320.2, 16.6; 15/79, 83

[56] References Cited
UNITED STATES PATENTS

| | | | |
|---|---|---|---|
| 2,809,389 | 10/1957 | Collins et al. | 56/202 X |
| 2,990,666 | 7/1961 | Blume | 56/202 X |
| 3,716,977 | 2/1973 | Jackson | 56/202 |
| 3,722,192 | 3/1973 | Corbett | 56/202 |

Primary Examiner—J. N. Eskovitz
Attorney, Agent, or Firm—Dennis K. Sullivan; Floyd B. Harman

[57] ABSTRACT

A debris receiving receptacle is mounted to the rear portion of a garden tractor or riding mower having a discharge outlet. Interconnecting the mower discharge outlet and receptacle is a conduit comprising, in rearward order, an outlet adapter, an extension member, an elbow having a fore and aft leg telescopingly receiving the extension member and a transverse leg discharging to the receptacle. The elbow is rotatably mounted on the receptacle frame to permit easy removal of the extension member for removing blockages. In a second embodiment the receptacle includes a frame defining an opening disposed about the periphery of the transverse leg, a porous outer shell member and an air impervious bag disposed within the outer shell member and clamped to the frame at its open end.

11 Claims, 6 Drawing Figures

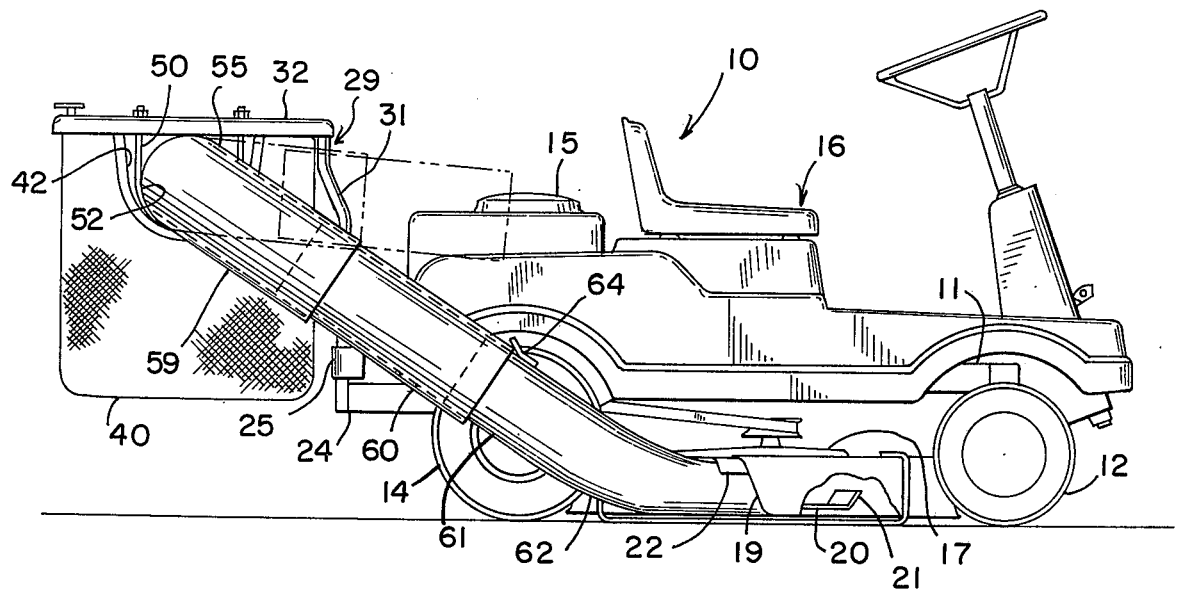
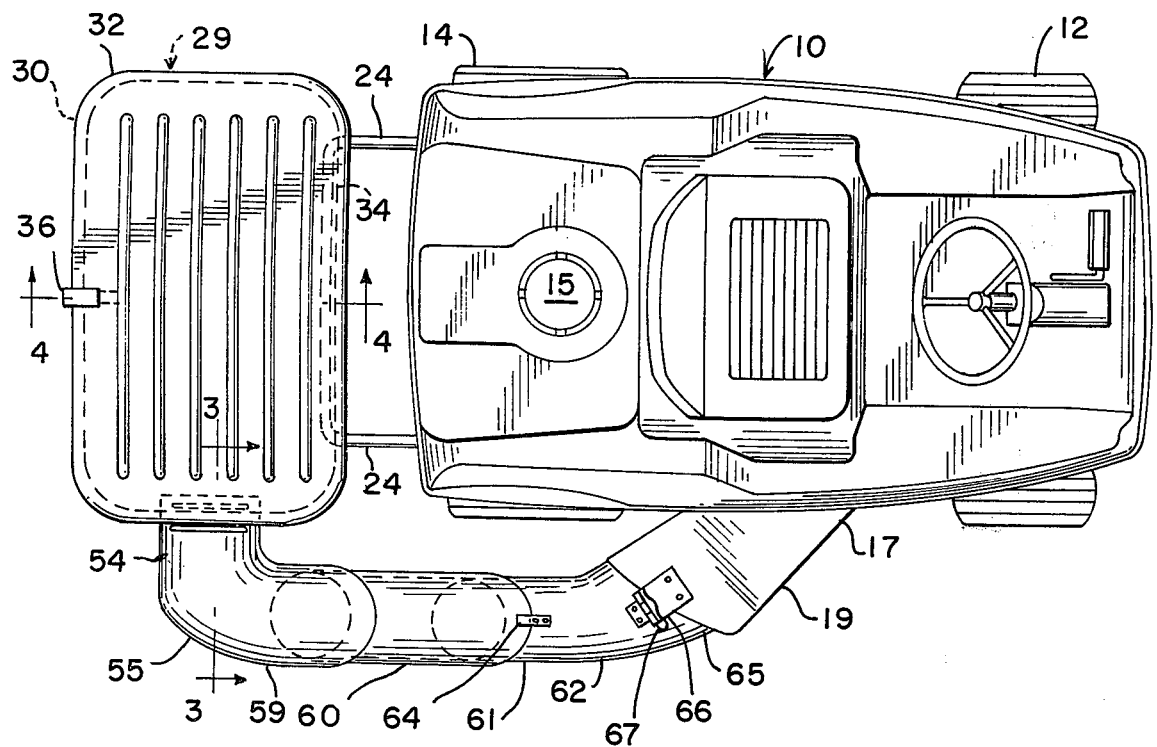

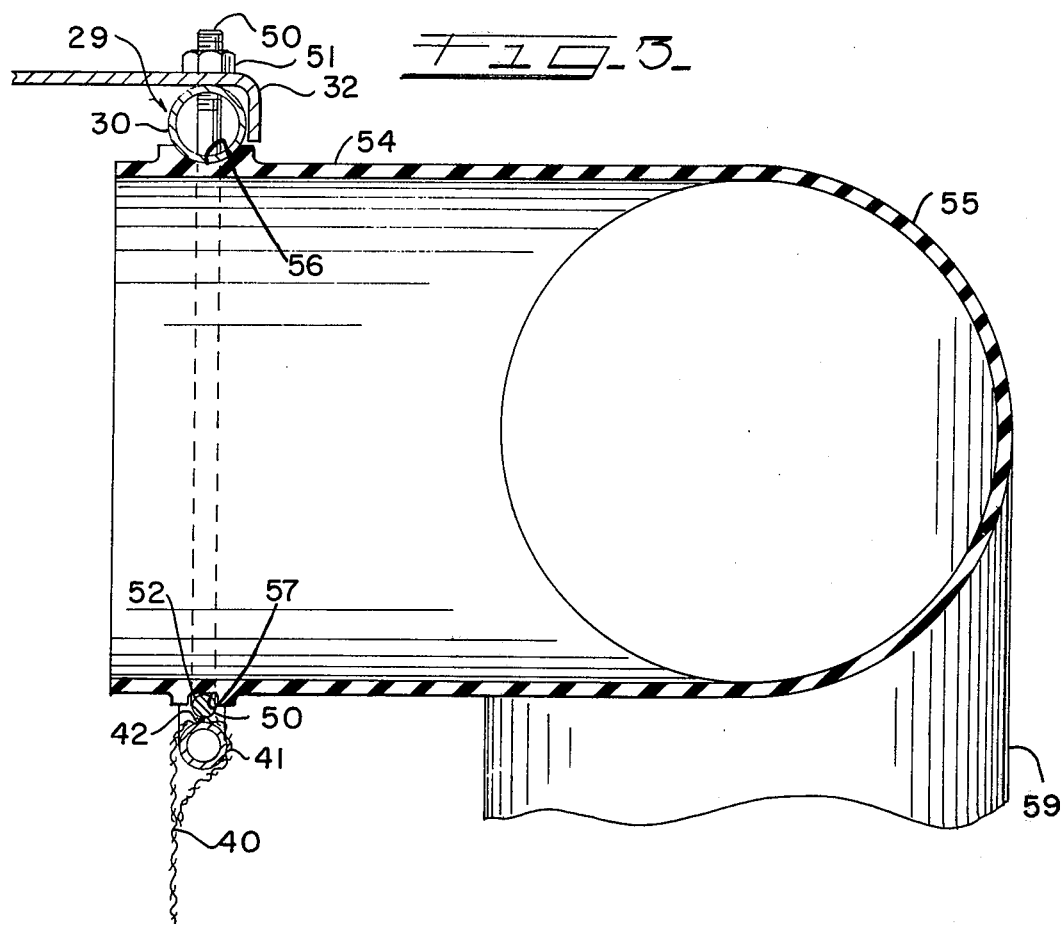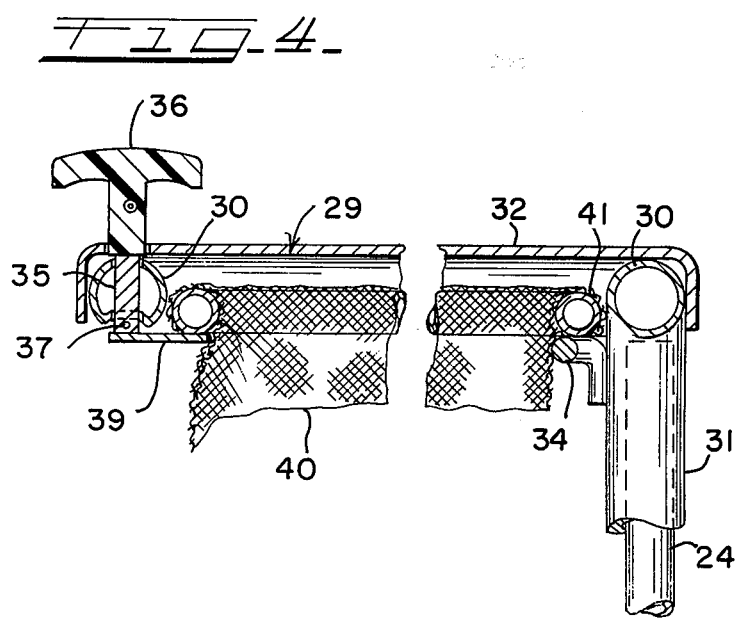

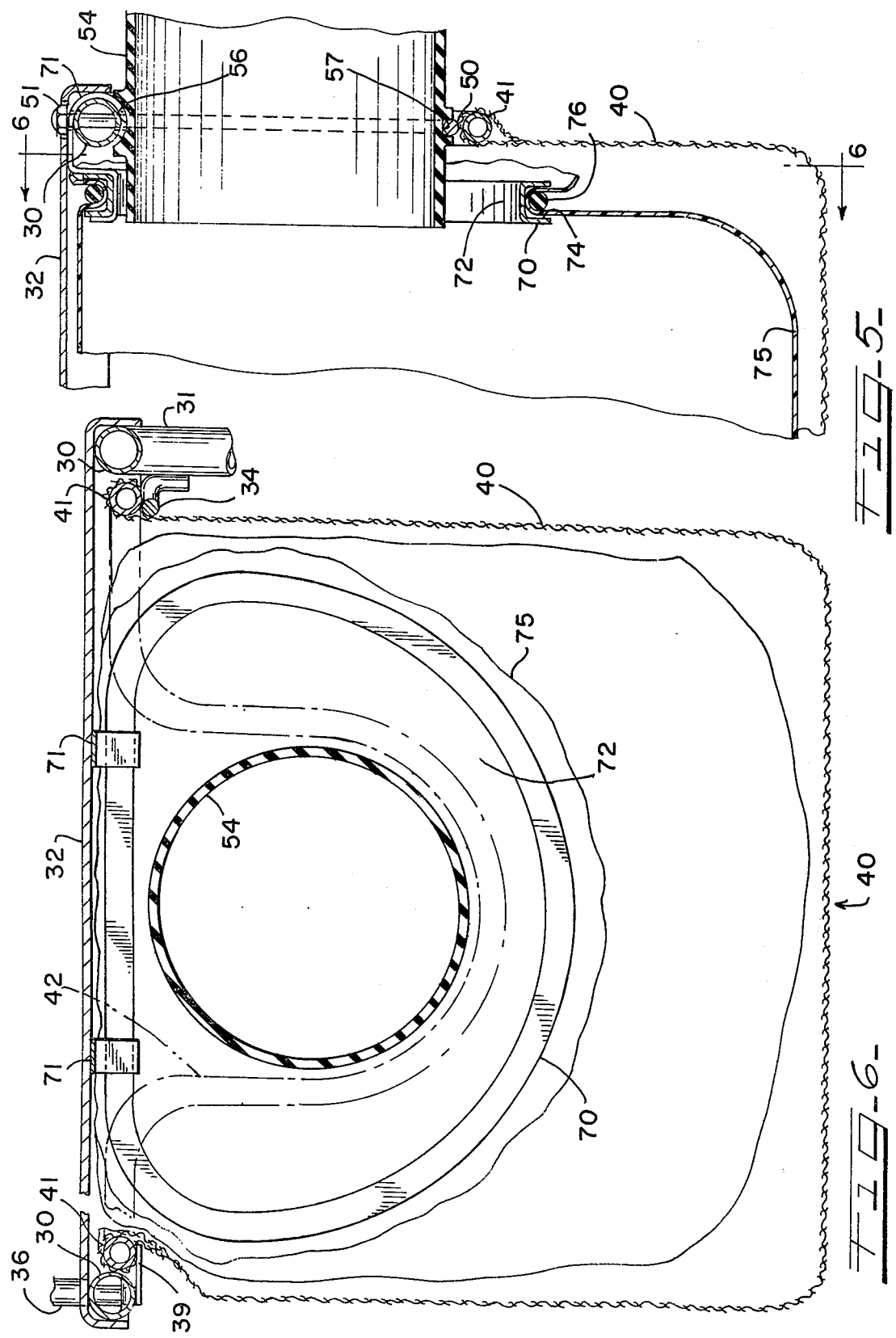

DEBRIS COLLECTOR FOR LAWN AND GARDEN MACHINES

BACKGROUND OF THE INVENTION AND THE PRIOR ART

This invention relates to lawn and garden tractors or riding mowers and, more particularly, to an improved debris or grass collecting attachment therefor.

Grass bagging attachments for lawn mowers of the walk-behind rotary type are well known. They generally comprise a bag mounted on the discharge chute and extending to the side. Although used on riding mowers, a side extending bagging attachment is detrimental because it increases the operating width of the machine and also, if it has a large capacity, can result in balance problems for the mower. Accordingly, grass bagging attachments have more recently appeared wherein the receptacle is mounted at the back of the garden tractor or riding mower and a conduit extends from the mower discharge outlet to the receptacle. Such an arrangement is illustrated in Jackson U.S. Pat. No. 3,716,977. An older patent showing a conduit-connected receptacle mounted on top of a walk-behind mower is shown in Blume U.S. Pat. No. 2,990,666, though such an attachment could not be utilized on a riding mower since it would interfere with the operator's area.

One problem which occurs in substantially all attachments of this nature is the tendency to plug up in heavier or wet grasses or if the receptacle becomes overfilled. Design parameters which effect plugging include the discharge velocity of the material, the length of the conduit, the height of the inlet to the receptacle, and the amount of sharp turns in the conduit. Given thick or heavy enough material, however, any machine will plug up since plugging is generally due to an insufficient amount of energy imparted to the grass clippings from the mower blade to propel them to the receptacle.

Accordingly, it is an object of the invention described herein to provide a debris collecting attachment for a riding mower or lawn tractor having conduit means between the mower discharge outlet and receptacle which are easily disassembled to permit the clearing of blockages therein.

It is further an object of the invention to provide a grass bagging attachment wherein the debris is introduced into the side of the receptacle thereby requiring less propelling power than in a top entry system.

Another consideration in the design of a debris collector is the convenience of the operator in removing the debris. The prior art illustrates a disposable plastic bag with some sort of screen means to permit the air to leave the bag while retaining the clippings. Examples of this on walk-behind mowers are found in U.S. Pat. Nos. 3,199,277 to Moody, 3,624,989 to Gatheridge, 3,722,192 to Corbert, and 3,777,461 to Giraud. The first three of these patents disclose vertically oriented bags wherein the material enters through the top. This increases the height to which the material must be elevated thereby increasing the chances of plugging especially when a long conduit is needed as with a riding mower. In Giraud, the bag is attached by an elastic band to a screen plate and extends horizontally rearwardly and to the side. However, the bag is unsupported except by a frame which extends within the bag. This lack of support could cause the bag to become ripped or torn and withdrawing the frame from the bag could cause grass spillage. Also as indicated above, the sideward mounting would appear to be detrimental to maintaining lateral stability of the mower.

Accordingly, it is a further object of one embodiment of the invention to provide a debris collecting attachment wherein the receptacle includes a horizontally oriented air impervious bag having a crop inlet and a frame defining an opening disposed about the inlet, the bag being enclosed within and supported by a porous outer shell member.

It is a further object of said embodiment to dispose said frame within the porous outer shell whereby said shell may be utilized to collect debris without said bag therewithin.

SUMMARY OF THE INVENTION

The above and other objects of the invention are met in a debris collecting attachment for a lawn and garden tractor or riding mower having a debris discharge outlet and means for propelling debris through a conduit to a receptacle mounted from the rear of the riding mower. The conduit comprises an elbow rotatably mounted in a transverse opening in the receptacle subframe, the elbow having a leg in a generally fore and aft plane which receives in telescoping engagement an elbow extension member, which in turn telescopingly engages an adapter member connected to the mower discharge outlet. The telescoping connection provides a sufficient retraction of the extension member in the elbow to allow the extension member to disengage the adapter and rotate away therefrom for easy cleanout. The transverse leg of the elbow is preferably lightly sphincterally engaged by the receptacle frame to enable it to be maintained in any position for ease of lining up parts during installation and to eliminate having to hold it during cleanout.

In a second embodiment, the receptacle includes a frame defined an opening disposed about the periphery of the transverse opening, an outer shell member mounted from the receptacle subframe, preferably enclosing the frame, and an air impervious bag disposed within the outer shell member and receiving the frame in its open end.

BRIEF DESCRIPTION OF THE DRAWINGS

Other objects and advantages of the invention will become apparent from the following detailed description taken in conjunction with the drawings, in which:

FIG. 1 is a side view of a riding mower having Applicants' debris collecting attachment installed thereon;

FIG. 2 is a top view of the riding mower shown in FIG. 1;

FIG. 3 is an enlarged sectional view of the riding mower shown in FIG. 2 taken along the line 3—3 thereof and specifically illustrating the interconnection of the elbow with the receptacle frame;

FIG. 4 is a sectional view of the riding mower shown in FIG. 2 taken along the line 4—4 thereof and specifically illustrating the attachment of the receptacle to the receptacle frame;

FIG. 5 is a sectional view similar to and taken along the same plane as FIG. 3 except illustrating an alternative embodiment of the receptacle portion of Applicants' debris collecting attachment; and, FIG. 6 is a sectional view taken along the line 6—6 of FIG. 5, just within the outer shell, the frame of the outer bag being illustrated in phantom.

DETAILED DESCRIPTION OF THE INVENTION

In the ensuing description, the terms "left," "right," "forward," "rear," "upward," and "downward," are to be construed as being viewed by one standing behind the vehicle in accordance with the conventions of the industry. These terms are used for convenience of description and should not be construed as limiting the invention to the specific orientation described.

Turning now to FIG. 1, there is shown a riding mower generally designated 10 of the type well known in the industry, such as the International Harvester Cadet 55 Riding Mower, which generally comprises a mobile frame 11 supported by front and rear wheels 12 and 14, respectively and having an engine 15 mounted at the rear for driving the rear ground wheels 14. An operator's station generally shown at 16 is provided on the frame 11 forwardly of the engine 15 and suitable steering and control mechanisms are provided in accordance with the art to provide a self-propelled vehicle. It would readily be understood that the riding mower shown could also be a lawn and garden tractor which is equally well known.

A rotary mower 17 is mounted beneath the frame 11 by a suitable linkage (not shown), such as is shown in U.S. Pat. No. 3,672,137 to Hamouz, et al. and is belt driven by the engine 15. The mower 17 is provided with a single discharge outlet 19 which extends out the right side of the vehicle preferably at a rearward angle. As is conventional, the mower 17 is further provided with a rotating blade 20 having wings 21 at each end extending upwardly and away from the direction of rotation preferably at an angle of about 60 degrees for imparting sufficient energy to the debris to carry it to the receptacle, the wings 21 being either an integral portion of the blade 20 or bolted thereto. Although not part of the present invention, the interior of the discharge outlet 19 is provided with a spring loaded nail or rock deflector 22 hingedly attached thereto which has a first position nestled against the underside of the discharge outlet, as shown in FIG. 1. When the debris collecting attachment is not in place (not shown), the deflector 22 is biased to a downwardly outward angle for deflecting rocks, nails, and other thrown objects to the ground in accordance with the safety standards promulgated by the Outdoor Power Equipment Industry.

The frame 11 of the riding mower 10 is further provided with a pair of L-shaped strut assemblies 24 laterally spaced thereon which extend to the rear and then bend upwardly, a bumper 25 extending horizontally between the two struts 24 immediately above the bend, the struts 24 extending upwardly for a considerable distance. When the debris collecting attachment is not on the riding mower, the vertical extensions of the struts 24 and the bumper 25 may form a suitable base for storing the riding mower vertically.

Turning now to Applicants' debris collecting attachment, the receptacle subframe assembly 29 comprises a horizontal rectangular tubular frame 30 provided on its forward side with a pair of downwardly depending legs 31 integrally attached thereto which slidingly receive the upright portions of the struts 24 (FIG. 4), the struts 24 thereby providing a support for the subframe assembly 29 which extends horizontally rearwardly therefrom. The receptacle cover 32, which may be made of plastic, extends across the top of the frame 30 and has its edges bent around the side thereof and may be attached to the subframe by bolts or spring clips if desired. A horizontally extending rod 34 extends laterally just rearwardly of the front side of the frame 30 between the downwardly depending members 31, to which it is welded at each end, the rod 34 being located so that its top portion is about even with the lower side of the tubular frame 30. At the center of the rear portion of the frame 30, a shaft 35 extends vertically through the frame 30 and is provided at its top end with a handle 36 which extends through the top cover 32. The lower portion of the shaft 35 is provided with a lever arm 39. Immediately above the lever 39, the shaft 35 is provided with a detent pin 37 which cooperates with a complementary detent on the frame assembly 30 to maintain the lever 39 in a forwardly extending position.

The debris receiving receptacle 40 comprises a porous bag of cloth or plastic mesh material having a tubular metal frame 41 of a generally rectangular configuration at its open end, the size of the rectangle being slightly smaller than the size of the tubular frame 30 to nest therewithin. The top edge of the cloth portion of the bag is looped around the frame 41 (FIG. 3), the ends of the loop being zippered or sewn together as desired. The right side of the frame 41 and bag 40 are provided with a generally U-shaped opening 42 to provide the intake opening thereinto, as best seen in FIG. 1. Returning to FIG. 4, the receptacle 40 is supported through its frame 41 by having the front side of the frame 41 resting on top of the horizontal rod 34 and having its rear side supported by the lever 39. Thus, to install the bag on the receptacle frame, the lever 39 is rotated by the handle 36 to a position parallel to the tubular frame 30. In this position, the forward side of the frame 41 is slid up on top of the horizontal rod 34, the rear side is manually raised, and the lever 39 rotated to a fore and aft position to support the rear side of the frame 41. Removal of the receptacle would be accomplished by the reverse procedure.

Turning now to the conduit means for conducting material from the discharge outlet of the mower 17 to the receptacle, the subframe assembly 29 is provided on its right side with a downwardly depending U-bolt 50, the legs thereof extending through the tube 30 which are retained by nuts 51 which may also be used to hold down the cover 32 as shown in FIG. 3. The U-bolt 50 thus defines a horizontal transverse opening 52 in the subframe 29. The transverse leg 54 of a hollow 90 degree elbow 55 is mounted within the U-shaped opening 52 and is provided with a large detent 56 on its top side for receiving the tube 30 and a small detent 57 on its lower side for receiving the lower end of the U-bolt 50. The detents 56 and 57 prevent axial movement of the transverse leg 54 relative to the receptacle. For reasons to be seen hereinafter, the U-bolt 50 is tightened by the bolts 51 so as to lightly sphincterally embrace the transverse leg 54 of the elbow 55 to inhibit free rotation of the elbow therein while permitting manual rotation.

The elbow 55, which is preferably made of rubber or plastic having a circular cross section, has a fore and aft extending leg 59 which extends downwardly and forwardly in the direction of the discharge outlet 19 of the mower 17. Telescopingly engaged within the fore and aft leg 59 of the elbow, is an elbow extension member 60 comprising a clear plastic tube having an outer diameter just smaller than the inner diameter of the fore and aft leg 59, the tube 60 sliding more or less freely therein. Slidingly or telescopingly engaged with the forward end of the extension member 60 is the rear portion 61 of a discharge outlet adapter member 62. The rear portion 61 is also provided with a clip 64 to prevent the forward and downward travel of the extension member 60 thereon to a point where the rear portion of the extension 60 could separate from the elbow 55. The outlet adapter extends downward forwardly from the rear portion 61 and contains an intermediate transition section wherein it changes from a substantially circular cross section at the rear to a generally rectangular cross section at the front. The forward portion 65 plugs into the discharge outlet 19 of the mower to a stop provided thereinside. The upper side of the chute adapter 62 and discharge outlet 19 are provided with mating sections of a hinge assembly 66 with a removable pin 67 to retain the outlet adapter in the discharge outlet.

In operation, when it is desired to clean out the conduit, the chute extension member 60 is slid rearwardly into the elbow 55 until it clears the end of the rear portion 61 of the outlet adapter member 62. At this point, both the extension member 60 and the elbow 55 may be swung upwardly to the position in phantom in FIG. 1, the sphincteral grasp of the U-bolt 50 about the transverse leg of the elbow 55 maintaining the parts in position. The operator may now remove the extension member if necessary for cleaning out. The same procedure may be followed during the removal of the grass catching attachment from the riding mower.

It is noted that it is preferable for the outlet adapter, extension member, and elbow to have successively increasing diameters to reduce the potential for the conduit to block up. It is also preferable that the U-shaped opening 42 on the right side of the receptacle 40 come as close as possible to the elbow 55 in order to prevent spillage through the opening.

THE EMBODIMENT OF FIGS. 5 AND 6

This embodiment comprises an improvement of the receptacle means to utilize a standard disposable plastic trash bag. Other than is shown, it is exactly the same as described above. Accordingly, all of the reference numerals previously utilized will be retained.

The improved receptacle means comprises, in addition to the foregoing receptacle 40, an outer frame 70 disposed within but closely adjacent the right side of the receptacle 40. The frame 70 is attached to the tubular frame 30 by a pair of mounting brackets 71 disposed on the frame fore and aft of the transverse leg 54 of the elbow, the brackets 71 being welded to the frame 70 to support it in a vertical plane. The frame 70 is generally kidney shaped and defines an opening 72 disposed about the periphery of the transverse leg 54 of the elbow 55, extending about three inches fore and aft of the leg 54 and about two inches below. The outer periphery of the frame 70 comprises an outwardly opening channel 74 which fits within the open end of an air impervious bag 75 which extends laterally within the receptacle 40, the receptacle 40 thereby becoming an outer shell to support the bag 75.

The bag 75 is bunched up around and into the channel 74 and is held in place by an elastic band 76, the only air exit from the bag being through the opening 72 around the elbow. It has been found beneficial to have the exit opening 72 disposed about the inlet elbow 55, as above described. It is believed that this arrangement creates a cyclonic effect within the bag so that the clippings or debris fall out of the air stream and remain in the bag while the air escapes through the opening, thereby eliminating the need for a screened exit as in the prior art.

It is noted that the frame 41 of the outer shell 40 extends over the opening 72. Thus, the little debris which may remain entrained in the air stream is caught by the outer shell 40. This arrangement also provides the operator with the ability to operate the attachment either with or without the plastic bag 75 thereinside. As indicated above, the porous outer bag 40 becomes a support member for the plastic bag which may be of very thin material and prevents it from ripping. When the plastic bag becomes full, the operator may simply remove the elastic band and the trash bag full of clippings and may conveniently transport it to a disposal area and install a new plastic bag within the receptacle 40.

Thus, there has been provided a debris collecting attachment for a riding mower which fully satisfies all the objects and advantages set forth above. It is recognized that others, in view of the above disclosure, may find modifications thereof. Accordingly, it is attended to embrace all such modifications as may fall within the scope of the following claims.

We claim:

1. For a riding type lawn mower, said mower including a mobile frame having a rotary mower mounted thereto, said mower having a discharge outlet, a grass collecting attachment comprising:

a subframe attached to the rear portion of said mobile frame;

grass receiving receptacle means removably attached to said subframe;

a hollow elbow having a transverse leg rotatably mounted to said subframe and a forwardly and downwardly extending leg;

an elbow extension member telescopingly engaged with said forwardly and downwardly extending leg; and, an outlet adapter member having a rearward portion slidingly engaging said elbow extension member and a forward portion engaged with said mower discharge outlet, said elbow extension being sufficiently retractable toward said elbow as to permit said elbow extension to disengage and be rotated away from said outlet adapter member.

2. The invention in accordance with claim 1 and said outlet adapter having means for preventing the forward travel of said extension member thereon to a point permitting separation of said elbow and said extension member.

3. The invention in accordance with claim 1 and said subframe including a downwardly depending U-shaped portion defining a transverse opening, said elbow being mounted in said opening.

4. The invention in accordance with claim 3 and said elbow being lightly sphincterally embraced by said U-shaped portion to inhibit free rotation of said elbow while permitting manual rotation thereof.

5. For a riding type lawn mower, said mower including a mobile frame having a rotary mower mounted thereto, said mower having a discharge outlet, a grass collecting attachment comprising:

a subframe attached to the rear portion of said mobile frame, said subframe including a downwardly depending U-shaped portion defining a transverse opening;

grass receiving receptacle means removably attached to said subframe;

a hollow elbow having a transverse leg rotatably mounted in said transverse opening in said subframe, said transverse leg of said elbow having an external circumferential indentation, said U-shaped portion engaging said indentation to prevent transverse movement of said elbow, and a forwardly and downwardly extending leg;

an elbow extension member telescopingly engaged with said forwardly and downwardly extending leg; and, an outlet adapter member having a rearward portion slidingly engaging said elbow extension member and a forward portion engaged with said mower discharge outlet, said elbow extension member being sufficiently retractable toward said elbow as to permit said elbow extension member to disengage from said outlet adapter member.

6. For a riding type lawn mower, said mower including a mobile frame having a rotary mower mounted thereto, said mower having a discharge outlet, a grass collecting attachment comprising:

a subframe attached to the rear portion of said mobile frame, said subframe including a downwardly depending U-shaped portion defining a transverse opening;

grass receiving receptacle means removably attached to said subframe;

a hollow elbow having a transverse leg rotatably mounted in said opening in said subframe and a forwardly and downwardly extending leg;

an elbow extension member telescopingly engaged with said forwardly and downwardly extending leg;

an outlet adapter member having a rearward portion slidingly engaging said elbow extension member and a forward portion engaged with said mower discharge outlet, said elbow extension member being sufficiently retractable toward said elbow as to permit said elbow extension member to disengage and be rotated away from said outlet adapter member; and an open peripheral frame defining an opening disposed about the periphery of said U-shaped portion, said receptacle means comprising a porous outer shell member attached to said subframe and adapted to receive an air impervious bag therewithin, said bag having an open end for receiving said peripheral frame.

7. The invention in accordance with claim 6 and said frame being disposed within said porous outer shell member to permit operation of said attachment without said air impervious bag.

8. In a garden tractor having a debris discharge outlet, means for propelling said debris from said outlet, receptacle means for receiving said debris, said receptacle means including a subframe portion having a transverse opening, and conduit means defining a continuous unobstructed passage interconnecting said discharge outlet with said receptacle means, the improvement wherein said conduit means comprises outlet adapter means engaging said outlet and having an upwardly and rearwardly extending portion, an elbow extension member telescopingly engaging said portion of said outlet adapter means, and an elbow member having a fore and aft leg telescopingly engaging said extension member and a transverse leg rotatably mounted in said transverse opening for rotation of said fore and aft leg and said extension member away from said outlet adapter means upon retraction of said extension member toward said elbow.

9. In a garden tractor having a debris discharge outlet, means for propelling said debris from said outlet, receptacle means for receiving said debris, said receptacle means including a subframe portion having a transverse opening, and conduit means defining a continuous unobstructed passage interconnecting said discharge outlet with said receptacle means, the improvement wherein said conduit means comprises outlet adapter means engaging said outlet and having an upwardly and rearwardly extending portion, an elbow extension member telescopingly engaging said portion of said outlet adapter means, and an elbow member having a fore and aft leg telescopingly engaging said extension member and a transverse leg rotatably mounted in said transverse opening, said transverse leg of said elbow member having detent means engaging said frame portion to permit rotation of said transverse leg in said opening while preventing axial movement thereof.

10. The invention in accordance with claim 9 and said transverse leg being lightly sphincterally embraced by said frame portion to inhibit free rotation of said leg therein while permitting manual rotation thereof.

11. In a garden tractor having a debris discharge outlet, means for propelling said debris from said outlet, receptacle means for receiving said debris, said receptacle means including a subframe portion having a transverse opening, and conduit means defining a continuous unobstructed passage interconnecting said discharge outlet with said receptacle means, the improvement wherein said conduit means comprises outlet adapter means engaging said outlet and having an upwardly and rearwardly extending portion, an elbow extension member telescopingly engaging said portion of said outlet adapter means, and an elbow member having a fore and aft leg telescopingly engaging said extension member and a transverse leg rotatably mounted in said transverse opening, and said receptacle means comprises a subframe, an open frame defining a transverse opening disposed about the periphery of said transverse opening in said subframe portion, a porous outer shell member supported by said subframe, and an air impervious bag disposed within said outer shell member, said frame being received in and peripherally engaged by the open end of said bag.

* * * * *